(12) United States Patent
Townsend

(10) Patent No.: US 10,928,199 B2
(45) Date of Patent: Feb. 23, 2021

(54) ANGULAR RATE SENSORS HAVING SUPPORTING STRUCTURES WHICH COMPRISE ONE PASSIVE SUPPORTING STRUCTURE

(71) Applicant: Atlantic Inertial Systems Limited, Plymouth (GB)

(72) Inventor: Kevin Townsend, Liskeard (GB)

(73) Assignee: ATLANTIC INERTIAL SYSTEMS, LIMITED, Plymouth (GB)

( * ) Notice: Subject to any disclaimer, the term of this patent is extended or adjusted under 35 U.S.C. 154(b) by 0 days.

(21) Appl. No.: 16/261,813

(22) Filed: Jan. 30, 2019

(65) Prior Publication Data

US 2019/0242708 A1  Aug. 8, 2019

(30) Foreign Application Priority Data

Feb. 6, 2018  (GB) ...................... 1801930

(51) Int. Cl.
*G01C 19/5677* (2012.01)
*H03H 9/02* (2006.01)
(Continued)

(52) U.S. Cl.
CPC ..... *G01C 19/5684* (2013.01); *G01C 19/5783* (2013.01)

(58) Field of Classification Search
CPC ............ G01C 19/5776; G01C 19/5726; G01C 19/5755; G01C 25/00; G01C 19/56; G01C 19/5691; G01C 25/005
See application file for complete search history.

(56) References Cited

U.S. PATENT DOCUMENTS 5,739,410 A   4/1998  Fell
5,932,804 A   8/1999  Hopkin
(Continued)

FOREIGN PATENT DOCUMENTS

EP   0177551 A1   4/1986
EP   2799814 A1   11/2014
(Continued)

OTHER PUBLICATIONS

European Search Report for Application No. 19275014.9, dated Jul. 2, 2019, 9 pages.
(Continued)

*Primary Examiner* — Brandi N Hopkins
(74) *Attorney, Agent, or Firm* — Cantor Colburn LLP

(57) ABSTRACT

A vibrating structure angular rate sensor is provided which comprises a substrate; a plurality of flexible supporting structures fixed to the substrate; an annular member which is flexibly supported by the plurality of supporting structures to move elastically relative to the substrate; and an electrical drive system configured to drive the annular member to oscillate in a primary mode of oscillation with a resonant frequency $f_1$. The plurality of supporting structures comprises at least one active supporting structure which carries an active electrical connection from the annular member to the drive system; and at least one passive supporting structure which does not carry an active electrical connection from the annular member to the drive system.

14 Claims, 6 Drawing Sheets

(51) Int. Cl.
  *B81B 3/00* (2006.01)
  *G01C 19/5684* (2012.01)
  *G01C 19/5783* (2012.01)

(56) References Cited

U.S. PATENT DOCUMENTS

| | | |
|---|---|---|
| 6,471,883 B1 | 10/2002 | Fell et al. |
| 2001/0013252 A1 | 8/2001 | Namerikawa et al. |
| 2004/0134278 A1* | 7/2004 | Fell .................. G01C 19/5677 73/504.04 |
| 2004/0134279 A1* | 7/2004 | Fell .................. G01C 19/5684 73/504.13 |
| 2004/0144174 A1 | 7/2004 | Fell |
| 2005/0052092 A1 | 3/2005 | Laermer |
| 2010/0107761 A1 | 5/2010 | Ofri et al. |
| 2011/0023601 A1* | 2/2011 | Ikeda ................ G01C 19/5684 73/504.13 |
| 2011/0167911 A1 | 7/2011 | Fell et al. |
| 2011/0308315 A1 | 12/2011 | Araki |
| 2012/0125100 A1* | 5/2012 | Araki ................ G01C 19/5684 73/504.12 |
| 2014/0331769 A1 | 11/2014 | Fell |
| 2014/0338449 A1 | 11/2014 | Durston et al. |
| 2015/0040663 A1 | 2/2015 | Fell et al. |
| 2015/0211855 A1 | 7/2015 | Ruohio |

FOREIGN PATENT DOCUMENTS

| | | |
|---|---|---|
| EP | 3470784 A1 | 4/2019 |
| GB | 2460935 A | 12/2009 |
| WO | 2013136049 A1 | 9/2013 |
| WO | 2017025752 A1 | 2/2017 |

OTHER PUBLICATIONS

Intellectual Property Office Search Report for GB Application No. 1801930.7 dated Jul. 13, 2018, 4 pages.

* cited by examiner

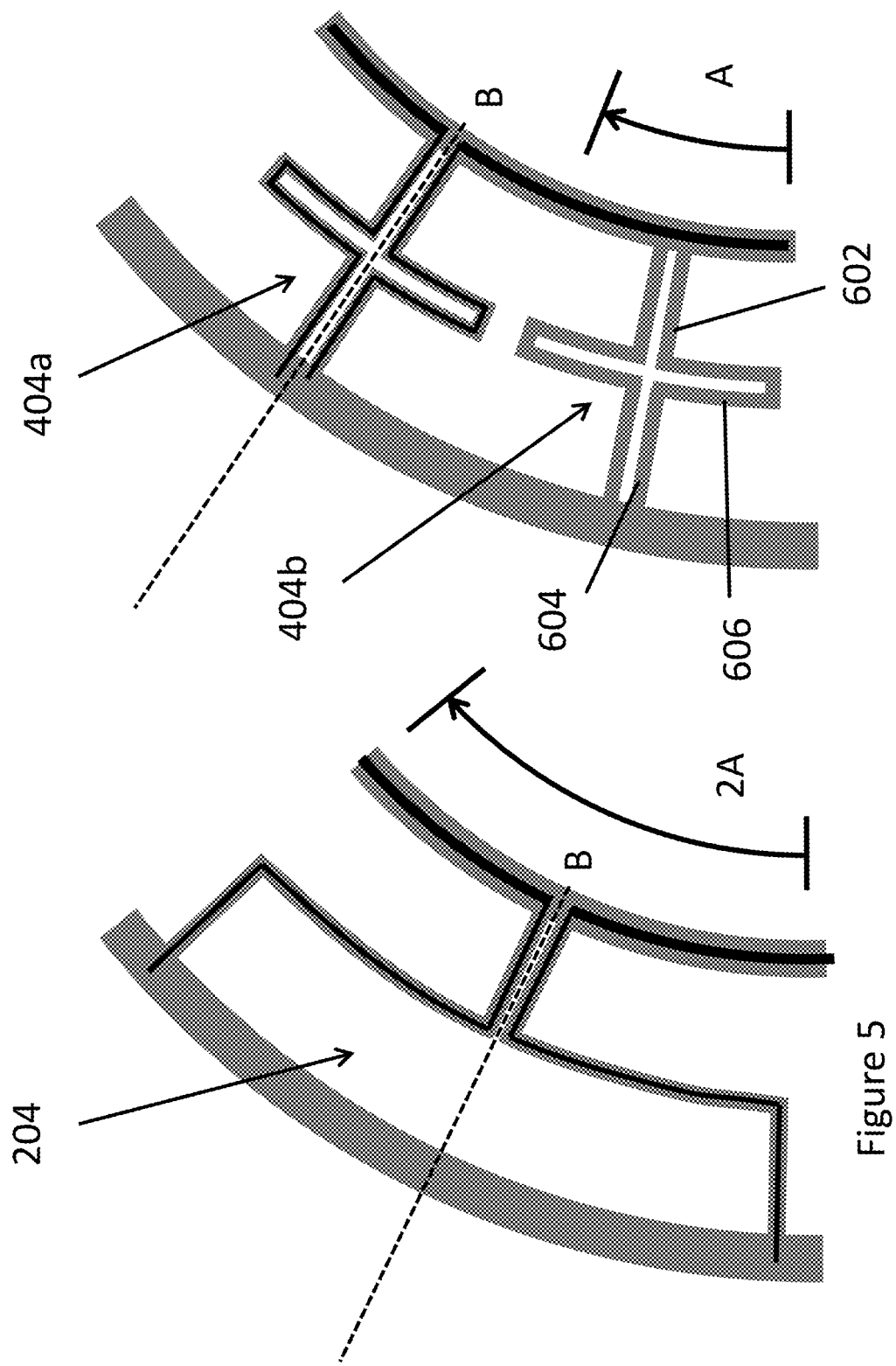

ANGULAR RATE SENSORS HAVING SUPPORTING STRUCTURES WHICH COMPRISE ONE PASSIVE SUPPORTING STRUCTURE

FOREIGN PRIORITY

This application claims priority to GB Patent Application No. 1801930.7 filed Feb. 6, 2018, the entire contents of which is incorporated herein by reference.

TECHNICAL FIELD

The present disclosure relates to vibrating structure gyroscopes and angular rate sensors, in particular Coriolis-type angular rate sensors comprising a vibrating structure such as an annular resonator.

BACKGROUND

For many modern applications, vibrating structure angular rate sensors (also known as gyroscopes) are constructed using Micro-Electro-Mechanical Systems (MEMS) techniques from a silicon wafer sandwiched between glass substrate layers. A planar annular resonator, typically comprising a ring structure, is formed in the silicon layer and supported on the lower substrate by flexible supporting structures. The annular resonator is driven into a primary mode of vibration at resonance by primary drive transducers that excite the primary vibration mode. When the sensor undergoes rotation about an axis perpendicular to the plane of the annular resonator, Coriolis forces are generated which couple energy into a secondary vibration mode, causing oscillation in this mode. Such Coriolis-induced motion of the annular resonator can be measured and is used to calculate the rate of angular motion experienced by the rate sensor. The ring and its supporting structures are in the same plane, manufactured by etching of the silicon layer. By exploiting two degenerate resonance modes with identical frequencies, the annular resonator has higher rotation sensitivity compared to moving mass architectures that use a single resonance mode for a vibrator that can be displaced out of plane. U.S. Pat. No. 6,471,883 provides an example of such an angular rate sensor comprising a planar ring vibrating structure manufactured from silicon.

In a vibrating structure angular rate sensor, the compliant or flexible supporting structures (often known as "legs") are designed to isolate the ring's vibration from the rest of the structure. Typically eight legs are used to elastically support the annular resonator in a Coriolis-type sensor driven to oscillate in-plane in the cos 2θ mode.

In inductive gyroscopes, the drive transducers comprise metal tracking disposed on the surface of the annular resonator. In use, oscillating current is supplied by a drive system to flow along the transducers via more metal tracking laid on the surface of the supporting legs. The annular resonator is subjected to a magnetic field and the current flowing along the metal tracking causes a force to be experienced by the annular resonator. By precisely positioning the metal tracking in segments, and carefully controlling the current supplied to each segment, forces can be produced along a given axis and the annular resonator is driven to oscillate in the desired primary vibration mode (e.g. cos 2θ).

A metal tracking arrangement can also be used to sense the motion of the inductive annular resonator. Pickoff transducers, also comprising metal tracking disposed on the surface of the annular resonator, are caused to move within the magnetic field due to the driving forces. As the metal tracks move within the magnetic field, currents are induced in the pick-off transducers, which flow to a pick-off system via metal tracking laid on the surface of the supporting legs. The pick-off system measures the current to sense the motion of the annular resonator.

In a conventional gyroscope, designed to operate in the cos 2θ mode, eight segments of metal tracking on the surface of the annular resonator are grouped in sets of two to form a primary drive transducer set (positioned at 0° and 180°), a primary pick-off transducer set (90° and 270°), a secondary drive transducer set (45° and 225°) and a secondary pick-off transducer set (135° and 315°). These must be accurately positioned to match the cos 2θ mode shape. As described above, in electromagnetically activated (i.e. inductive) sensors, the drive transducers are supplied with current and the pick-off currents are carried from the pick-off transducers via metal tracking laid on the surface of the supporting legs. As a result, the positions of the transducers and the positions of the supporting legs are directly linked.

The primary and secondary modes of vibration are usually balanced in frequency prior to use e.g. using laser balancing as disclosed in WO2013/136049, to compensate for geometrical imperfections in the ring. This is typically achieved by connecting balancing equipment to the transducers via the metal tracking on the supporting legs. The balancing equipment determines the resonant frequency along the primary axis by providing an oscillating current to the primary drive transducers and sensing the resultant motion using the primary pick-off transducers. The secondary transducers are then used to excite and determine the resonant frequency along the secondary axis. A laser is then used to remove material at appropriate positions relative to the transducer axes to make the two frequencies nominally identical. In some examples the difference between the resonant frequencies of the primary and secondary modes of oscillation after balancing is less than 1 Hz, is preferably less than 0.5 Hz and is further preferably less than 0.1 Hz.

However, the physical properties of vibrating structure angular rate sensors (i.e. the ring and the supporting legs) cause the resonant frequency of oscillation in both the primary and secondary modes to change as the amplitude of oscillation increases. At small amplitudes the resonant frequencies are generally constant, but as the amplitude increases the frequencies change non-linearly, and the resonant frequencies of the two modes change. In normal operation, the amplitude of the secondary mode of oscillation is typically much lower than that of the primary mode, and therefore even when the modes are balanced prior to use, frequency splitting occurs during operation. For example, for a gyroscope operating at a typical resonant frequency of 14 kHz, there usually remains a residual imbalance of ~1 Hz even after balancing. The configuration of the support legs impacts the geometric non-linearity of the sensor. With eight support legs the frequencies split predominantly due to the cubic geometrical non-linear behaviour of the legs for both radial and tangential motion during vibration. Since the resonant frequencies of the two modes are no longer identical in this non-linear regime, the sensitivity of the sensor decreases and the noise on the measurements increases. Consequently, in many typical vibrating structure angular rate sensors seen in the prior art, the annular resonator is driven to oscillate only in the linear regime, to ensure the resonant frequencies of the primary and secondary modes do not split and impact measurements.

It is known, however, that frequency splitting due to this non-linearity can be mitigated somewhat by providing a particular number of supporting structures, e.g. 16 pairs of support legs for the cos 2θ mode. However, there remain significant challenges in manufacturing and implementing a rate sensor with the requisite number of supporting structures to mitigate frequency splitting.

SUMMARY

The present disclosure provides a vibrating structure angular rate sensor that includes a substrate and a plurality of flexible supporting structures fixed to the substrate. The senor also includes an annular member which is flexibly supported by the plurality of supporting structures to move elastically relative to the substrate and an electrical drive system configured to drive the annular member to oscillate in a primary mode of oscillation with a resonant frequency $f_1$. The plurality of supporting structures includes: at least one active supporting structure which carries an active electrical connection from the annular member to the drive system; and at least one passive supporting structure which does not carry an active electrical connection from the annular member to the drive system.

It will be seen by those skilled in the art that, in accordance with this disclosure, utilising passive and active supporting structures to flexibly support the angular resonator allows existing components, processes and test facilities to be used to manufacture and test an angular rate sensor on which the effects of non-linearity are reduced. Using at least one passive supporting structure enables the total number of supporting structures to be varied with greater ease and flexibility, without necessarily changing the number of active electrical connections to the annular member.

The electrical drive system may comprise any suitable drive system known in the art per se, for example a capacitive or piezoelectric drive system. However in preferable examples, the electrical drive system comprises an inductive drive system.

What is meant by an active electrical connection from the annular member to the drive system is a physical connection, for example conductive (e.g. metallic) tracking, carried by the supporting structure and electrically connected to the drive system such that an electrical current can flow from the drive system to the annular member along the active supporting structure. A passive supporting structure is one that does not carry an active electrical connection from the annular member to the drive system. There may still be a physical connection, for example conductive (e.g. metallic) tracking, carried by the supporting structure but not one that is electrically connected to the drive system. So no electrical current can flow from the drive system to the annular member along the passive supporting structure. It will be appreciated that the active and passive supporting structures may take the same physical form but differ in terms of whether they carry an electrical connection that is electrically connected to the drive system or not.

In one or more examples, each active and/or passive supporting structure comprises a pair of respective active or passive sub-structures, the sub-structures being physically separate but both contacting the annular member at a point having substantially the same angular position around a circumference of the annular member (e.g. each supporting structure may comprise a pair of mirror image sub-structures). Such examples are described further below.

The angular rate sensor preferably comprises a pick-off system arranged to determine the amplitude of motion of a secondary mode of oscillation at a resonant frequency $f_2$, in which oscillation of the annular member is induced by the Coriolis force resulting from an angular rate experienced by the angular rate sensor. Such a pick-off system enables an angular rate measurement to be made (as described below).

Preferably, a total number p of the active and passive supporting structures is selected such that $f_1=f_2$. Selecting the total number p of supporting structures such that $f_1=f_2$ ensures that, even when the annular member oscillates in the primary mode with a large amplitude of motion, geometric non-linearity does not cause frequency splitting between the primary and secondary modes of oscillation.

This enables the annular resonator to be driven at large amplitudes, wherein the restoring force has a non-linear relationship with the amplitude of motion. This means that the secondary mode oscillations induced are greater in amplitude and therefore the uncertainty on measurements of the secondary mode oscillation amplitude may be decreased. This enables the production of more sensitive angular rate sensors.

Providing both active and passive supporting structures enables the total number p of supporting structures to be selected such that $f_1=f_2$ without requiring a significant redesign of parts of the sensor.

While the resonant frequencies of the primary and secondary modes still shift with larger amplitudes, they shift by substantially the same amount, such that their frequencies do not split and the measurements made by the angular rate sensor are not affected. The number p of active and passive supporting structures in the plurality of supporting structures can be selected such that $f_1=f_2$ throughout operation of the sensor.

Preferably the primary mode of oscillation is a cos nθ mode, and the secondary mode of oscillation is a sin θ mode, where n is the order of the mode, and is equal to any positive integer. Further preferably the primary mode of oscillation is a cos 2θ mode (i.e. elliptical), as this maximises the attainable signal to noise ratio of the sensor, although it may comprise a cos 3θ mode and/or a cos 4θ mode. The secondary mode of vibration is preferably a sin 2θ mode, although it may comprise a sin 3θ or sin 4θ mode. In one or more of these examples, the annular member is driven to oscillate in-plane in a cos nθ mode.

In some sets of examples the total number of active and passive supporting structures p is chosen such that $$k\frac{n}{p} \neq \text{integer,}$$

where x is an integer between 1 and 6 and n is the order of the primary mode of oscillation, e.g. a cos nθ mode.

As is mentioned above, the electrical drive system may be an inductive drive system. The annular member preferably comprises at least one transducer, for example a plurality of transducers arranged around its circumference. The plurality of transducers may be spaced evenly around the circumference of the annular member. In some examples the at least one active supporting structure carries an active electrical connection from one of the plurality of transducers to the electrical drive system. Preferably the at least one active supporting structure comprises a plurality of active supporting structures arranged to form active electrical connections from the drive system to each of the plurality of transducers. The active electrical connection between the drive system and each of the plurality of transducers may comprise conductive e.g., metal tracking, disposed on the active supporting structures. In examples where the active supporting structures comprise pairs of active sub-structures, each active sub-structure may carry a separate active electrical connection between the drive system and one of the plurality of transducers. A given pair of active substructures may carry a pair of separate active electrical connections between the drive system and the same transducer, or between the drive system and a pair of adjacent transducers.

In preferable examples, the at least one passive supporting structure does not carry an active electrical connection from any transducer to the electrical drive system. Because the at least one passive supporting structure does not carry an electrical connection to the drive system and, at least in some examples, to the transducers, the number and location of passive supporting structures can be varied without any need to significantly alter the design or position of the drive system and/or the transducers, saving both design and manufacturing expense.

In typical angular rate sensors, each of the supporting structures is "active", in that every structure is used to carry an electrical connection between the drive system and transducers on the annular member. As such, changing the total number of supporting structures previously required altering the number and/or the design of the transducers and possibly adding additional electrical connections to the drive system, as well as requiring changes to the layout of electrical connections elsewhere on the sensor. When existing high volume automated production facilities are used to manufacture these sensors, as is typical, this redesign process is expensive and time consuming.

The Applicant, however, has recognised that by providing a mixture of passive and active supporting structures, existing transducer layouts and production methods may be utilised whilst still ensuring that the required number of supporting structures to mitigate non-linearity is provided. The transducers and drive system may be designed to be used with a fixed number, design and/or position of active supporting structures, and then the number and/or position of passive supporting structures may then be freely varied without any need to redesign other components of the sensor. As such the total number of active and passive supporting structures is much more easily selected.

For example, an existing drive system, designed for use with a fixed number of supporting structures, could be used without significant modification within the angular rate sensor disclosed herein while the sensor still satisfies the supporting structure number requirement by utilising one or more passive supporting structures, which play no role in the driving of the oscillator and do not interact with the drive system. The passive legs merely provide additional points of support to ensure that the required symmetries are satisfied to mitigate non-linearities.

In preferred examples the plurality of supporting structures comprises a plurality of active supporting structures and at least an equivalent number of passive supporting structures. In some examples there are equal numbers of passive and active supporting structures provided, which alternate around the annular member. Alternatively, any number of passive supporting structures may be provided between each active supporting structure. Preferably there are the same number of passive supporting structures between each active supporting structure, for example one, two or three passive supporting structures between each active supporting structure. The number of passive and active supporting structures respectively is preferably chosen to satisfy the rules for the total number of supporting structures while maintaining compatibility with the primary drive transducers and the drive system.

Altering the total number of supporting structures to mitigate non-linearity has additional challenges, as it might require alterations to the fundamental shape and design of a typical angular rate sensor. For example, providing enough space for an increased number of supporting structures and/or required changes to the sensor layout might necessitate an increase in the overall dimensions of the annular member, or indeed the entire sensor. Changing the dimensions (e.g. the radius) of the annular member affects the resonant frequencies of the primary and secondary modes, which impacts on compatibility with control electronics and other components. A larger sensor has greater space requirements, but also might, for example, necessitate the redesign or reconfiguration of a whole system of components that are designed to be tightly packed near to or around the angular rate sensor. In addition, modification would be required to be made to testing and balancing equipment to either physically accommodate the redesigned sensor or to interface with redesigned and/or an increased number of electronic connections.

The Applicant has recognised that, however, a greater total number of supporting structures may be provided to support a given size of annular oscillator whilst maintaining an overall sensor size by using a particular shape of supporting structure.

In angular rate sensors typically seen in the art, the shape of the supporting structures provides the flexibility required to allow the annular member to oscillate by moving elastically relative to the substrate. Often a "dog-leg" shape comprising two angularly offset radial portions joined by a circumferential portion is used. This arrangement provides the requisite flexibility and strength, however it does take up a significant angular footprint. In some examples of the present disclosure therefore, one or more of the plurality of supporting structures has a reduced angular footprint. For example, one or more of the supporting structures may comprise a first radial portion connected to a second radial portion that is angularly aligned with the first radial portion. The first and second radial portions may be connected by a generally U-shaped circumferential portion. In examples where the supporting structures comprise pairs of sub-structures, each of the sub-structures may comprise a first radial portion connected to a second radial portion that is angularly aligned with the first radial portion, where the first and second radial portions may be connected by a generally U-shaped circumferential portion. Furthermore, in examples where the pairs of sub-structures are mirror image sub-structures, the generally U-shaped circumferential portions may be formed as mirror images along a line parallel to the first and second radial portions.

Preferably the degree of flexibility or indeed the stiffness of each of the plurality of supporting structures is equal. In some sets of examples, therefore, the shape and dimensions of the at least one passive supporting structure is identical to those of the at least one active supporting structure. In examples in which metal tracking is disposed on the active supporting structures, metal tracking may also be disposed on the passive supporting structures, to ensure that the physical properties of the two types of supporting structures are as similar as possible. In such examples however the metal tracking on the passive supporting structures is not, of course, electrically connected to the drive system. Alternatively, the passive supporting structures may be partially or entirely free of metal tracking.

As discussed above, the amplitude of motion of the secondary mode of oscillation is directly linked to the angular rate experienced by the angular rate sensor. Thus, in one or more examples, the pick-off system is arranged to calculate the angular rate experienced by the angular rate sensor using the determined amplitude of motion of the secondary mode of vibration. The calculation of angular rate using the determined amplitude of the secondary mode of oscillation is a standard technique known by those skilled in the art.

The amplitude of the secondary mode oscillations may be determined by directly measuring the amplitude of the secondary mode vibrations (known by those skilled in the art as an "open loop" system). In some examples the pick-off system is arranged to calculate the angular rate experienced by the angular rate sensor by directly measuring the amplitude of motion of the secondary mode of vibration in open loop. Alternatively the amplitude of the induced secondary mode oscillations are determined by applying a feedback force to the annular resonator and measuring the magnitude of feedback force required to nullify the secondary mode vibrations (a "closed loop" system). It is usual to provide a secondary drive signal which nulls the secondary motion (closed loop operation) at the same frequency as the primary drive signal. The secondary drive signal is then a measure of rotation rate.

Preferably, the resonant frequencies of the primary and secondary modes at low amplitude are substantially identical, e.g. 14 kHz. In some examples the difference between the resonant frequencies of the primary and secondary modes of oscillation is less than 1 Hz, is preferably less than 0.5 Hz and is further preferably less than 0.1 Hz. This may be achieved with the aid of any suitable balancing technique, for example as disclosed by WO 2013/136049, EP 1775551, U.S. Pat. No. 5,739,410 or GB 2460935. The inherent sensitivity (without factoring in this frequency splitting) of an annular resonator can be characterised by its Q factor or linewidth, and preferably the difference between the resonant frequencies is no more than 0.1 of the linewidth.

Preferably, the flexible supporting structures flexibly support the annular member such that it can oscillate freely in any direction relative to the substrate. The plurality of supporting structures may be fixed to the substrate in any suitable arrangement. The supporting structures may extend radially inward or outward of the annular member. In one or more examples the plurality of supporting structures are fixed to the substrate at a central support inside the annular member.

In some examples the supporting structures are formed integrally with the substrate. Additionally, or alternatively, the supporting structures are formed integrally with the annular member. The substrate, annular member and supporting structures are preferably made of the same material, and further preferably they are constructed from a single silicon wafer using techniques known in the art e.g., using deep reactive ion etching (DRIE).

In some sets of examples the supporting structures (both active and passive) are spaced equiangularly around a circumference (e.g. an inner or outer circumference) of the annular member. Where the supporting structures comprise pairs of sub-structures, preferably the points at which the sub-structures of each pair contact the annular member are spaced equiangularly around a circumference of the annular member. In many examples the secondary mode of oscillation is offset from the primary mode of oscillation by an angle $\varphi$, and it is desirable for the annular resonator to be supported by an integer number of supporting structures within the angular offset $\varphi$. This prevents, for example, the positioning of drive and pick-off system electrodes at the antinodes of the primary and secondary modes being hindered by coincidence with a supporting structure. Positioning drive and pick-off electrodes at the antinodes of the primary and secondary modes may increase the sensitivity of the angular rate sensor, as well as providing a more stable arrangement (because the primary and secondary modes are each aligned with a single drive transducer pair).

Preferably the total number of supporting structures (i.e. both active and passive) is chosen to be the lowest value of p that satisfies $$k\frac{n}{p} \neq \text{integer}$$

and allows an integer number of supporting structures to be positioned equiangularly within the angular offset $\varphi$ of the primary and secondary modes. Sensors with large numbers of supporting structures may be more difficult to manufacture, increasing the cost of the sensor, but more importantly increased numbers of supporting structures may increase the "stiffness" of the annular resonator and thus change the resonant frequency of the primary and/or secondary modes of oscillation.

In examples where the primary mode of oscillation is a cos 2θ mode, the secondary mode of oscillation is a sin 2θ mode, offset by 45° from the primary mode. In these examples where n=2 it is preferable for the total number p of supporting structures to be chosen such that p=16+8×(m−1), where m is a positive integer, e.g. m=1, 2, 3, etc. For example, 16 supporting structures or 24 supporting structures prevent frequency splitting while also ensuring an integer number of supporting structures are positioned within the 45° offset between the primary and secondary modes. In examples comprising 16 supporting structures, in which the primary mode of oscillation is a cos 2θ mode, the sensor preferably comprises eight passive supporting structures (e.g. eight pairs of passive sub-structures) and eight active supporting structures (e.g. eight pairs of active sub-structures) positioned such that active and passive supporting structures alternate around the annular member. In other examples the sensor may comprise 16 passive supporting structures and eight active supporting structures, arranged such that there are two passive structures between each active supporting structure.

In at least one example the sensor comprises eight passive supporting structures comprising eight pairs of passive sub-structures, i.e. 16 passive sub-structures, and eight active supporting structures comprising eight pairs of active sub-structures, i.e. 16 active sub-structures, positioned such that the active and passive supporting structures alternate around the annular member. In this example there are 32 sub-structures in total and 16 contact points between the annular member and the supporting sub-structures. As is mentioned above, the 16 contact points may be spaced equiangularly around a circumference of the annular member.

In examples where the primary mode of oscillation is a cos 3θ mode, the secondary mode of oscillation is a sin 3θ mode, offset by 30° from the primary mode. In these examples where n=3 it is preferable for the number p of supporting structures to be chosen such that p=24+12×(m−1), where m is a positive integer. For example, 24 supporting structures or 36 supporting structures may be chosen to ensure an integer number of supporting structures are positioned within the 30° offset between the primary and secondary modes. In examples comprising 24 supporting structures, in which the primary mode of oscillation is a cos 3θ mode, the sensor preferably comprises 12 passive supporting structures and 12 active supporting structures (e.g. three for each of primary drive, primary pick-off, secondary drive and secondary pick-off) positioned such that there is one passive structures between each active supporting structure.

In examples where the primary mode of oscillation is a cos 4θ mode, the secondary mode of oscillation is a sin 4θ mode, offset by 22.5° from the primary mode. In these examples where n=4 it is preferable for the number p of supporting structures to be chosen such that p=32+16×(m−1), where m is a positive integer. For example, 32 supporting structures or 48 supporting structures may be chosen to ensure an integer number of supporting structures are positioned within the 22.5° offset between the primary and secondary modes. In examples comprising 32 supporting structures, in which the primary mode of oscillation is a cos 4θ mode, the sensor preferably comprises 16 passive supporting structures and 16 active supporting structures (e.g. four for each of primary drive, primary pick-off, secondary drive and secondary pick-off) positioned such that there is one passive structure between each active supporting structure.

Preferably, the annular member comprises a ring, although it may comprise any generally annular shape, for example an octagon. For a cos 2θ primary mode of vibration, for example, the structure has to have at least 8θ symmetry to ensure that the primary and secondary modes remain degenerate.

The present disclosure is also applicable to rate integrating gyroscopes.

The present disclosure extends to a method of making a vibrating structure angular rate sensor, the angular rate sensor comprising a substrate, a plurality of flexible supporting structures fixed to the substrate and an annular member flexibly supported by the plurality of supporting structures to move elastically relative to the substrate; the method comprising selecting a total number of the plurality of supporting structures to include: at least one active supporting structure which carries an active electrical connection from the annular member to the drive system; and at least one passive supporting structure which does not carry an active electrical connection from the annular member to the drive system.

Such a method may further comprise designing the sensor to be operated by: applying a periodic driving force to the annular member such that the annular member oscillates, in use, in a primary mode of oscillation at a resonant frequency $f_1$ with an amplitude of motion that generates a restoring force from the plurality of supporting structures; and determining the amplitude of motion of a secondary mode of vibration at a resonant frequency $f_2$, in which oscillation of the annular member is induced by the Coriolis force resulting from an angular rate experienced by the angular rate sensor; wherein the restoring force has a non-linear relationship with the amplitude of motion in use; and selecting a number p of supporting structures in the plurality of supporting structures such that $f_1=f_2$ in use.

Features of any example described herein may, wherever appropriate, be applied to the disclosed method of making a vibrating structure angular rate sensor. Where reference is made to different examples or sets of examples, it should be understood that these are not necessarily distinct but may overlap.

The present disclosure further extends to a vibrating structure angular rate sensor made according to the disclosed method.

DETAILED DESCRIPTION

One or more non-limiting examples will now be described, by way of example only, and with reference to the accompanying figures, in which:

FIG. 5 shows the shape of a typical supporting structure seen in the prior art;

FIG. 6 shows a shape of supporting structures according to examples of the present disclosure.

DETAILED DESCRIPTION

Figure 1:
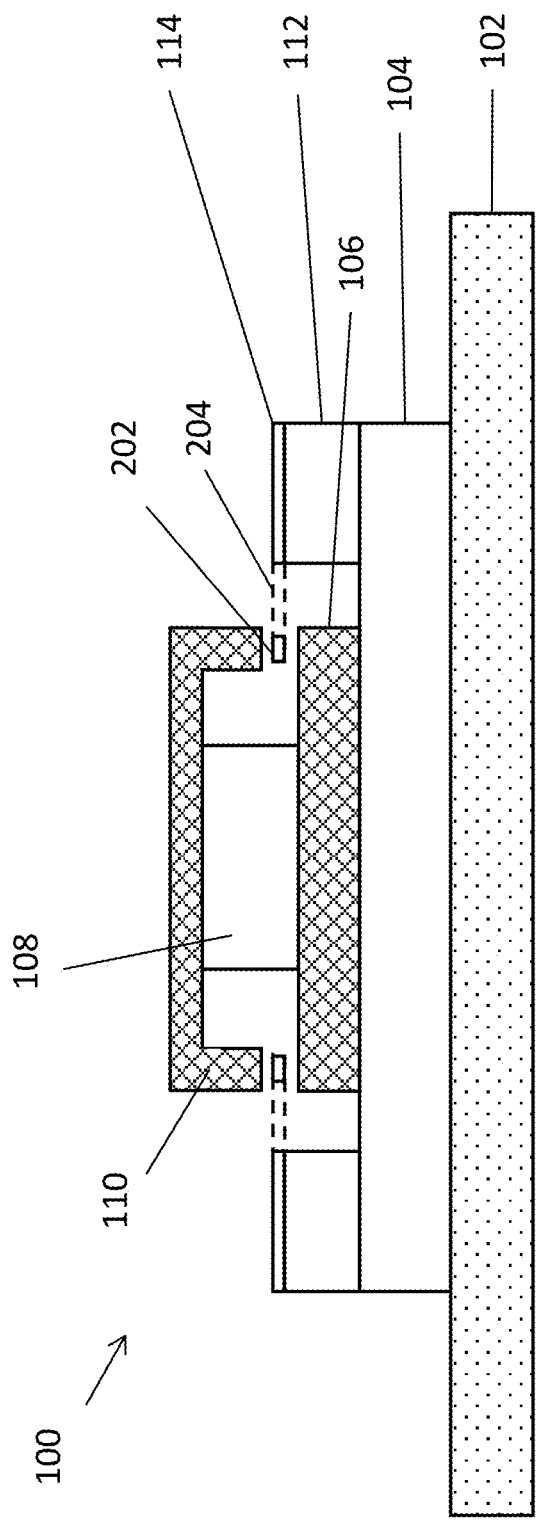
FIG. 1 is a schematic cross-sectional view of an inductive type vibrating structure angular rate sensor.

FIG. 1 is a schematic cross-sectional view of a inductive type vibrating structure angular rate sensor 100. A substrate comprises a base 102, on which sits a stack of components including a support glass layer 104, a lower pole 106, a magnet 108 and an upper pole 110. A pedestal 112 sits upon the support glass layer 104, peripheral to the lower pole 106, and supports a silicon substrate or die 114. A planar annular member (or "ring") 202 is flexibly supported by a plurality of supporting structures 204, each comprising a pair of mirror image legs, fixed at one end to the silicon die 114. The ring 202 is arranged so that it lies between the upper pole 110 and lower pole 106 and an inductive drive system applies a periodic driving force during use. When the magnet 108 creates a vertical magnetic field in the region of the ring 202, and an oscillating current is applied tangentially along metal tracks carried by the ring 202, the ring 202 is caused to oscillate radially in the primary Cos 2θ mode. WO 2010/007406, the contents of which are hereby incorporated by reference, provides further details about how metal tracks are typically provided over an insulating surface oxide layer on an upper surface of the ring 202 and along its supporting structures 204, each metal track associated with a single drive or pick-off transducer.

Figure 2:
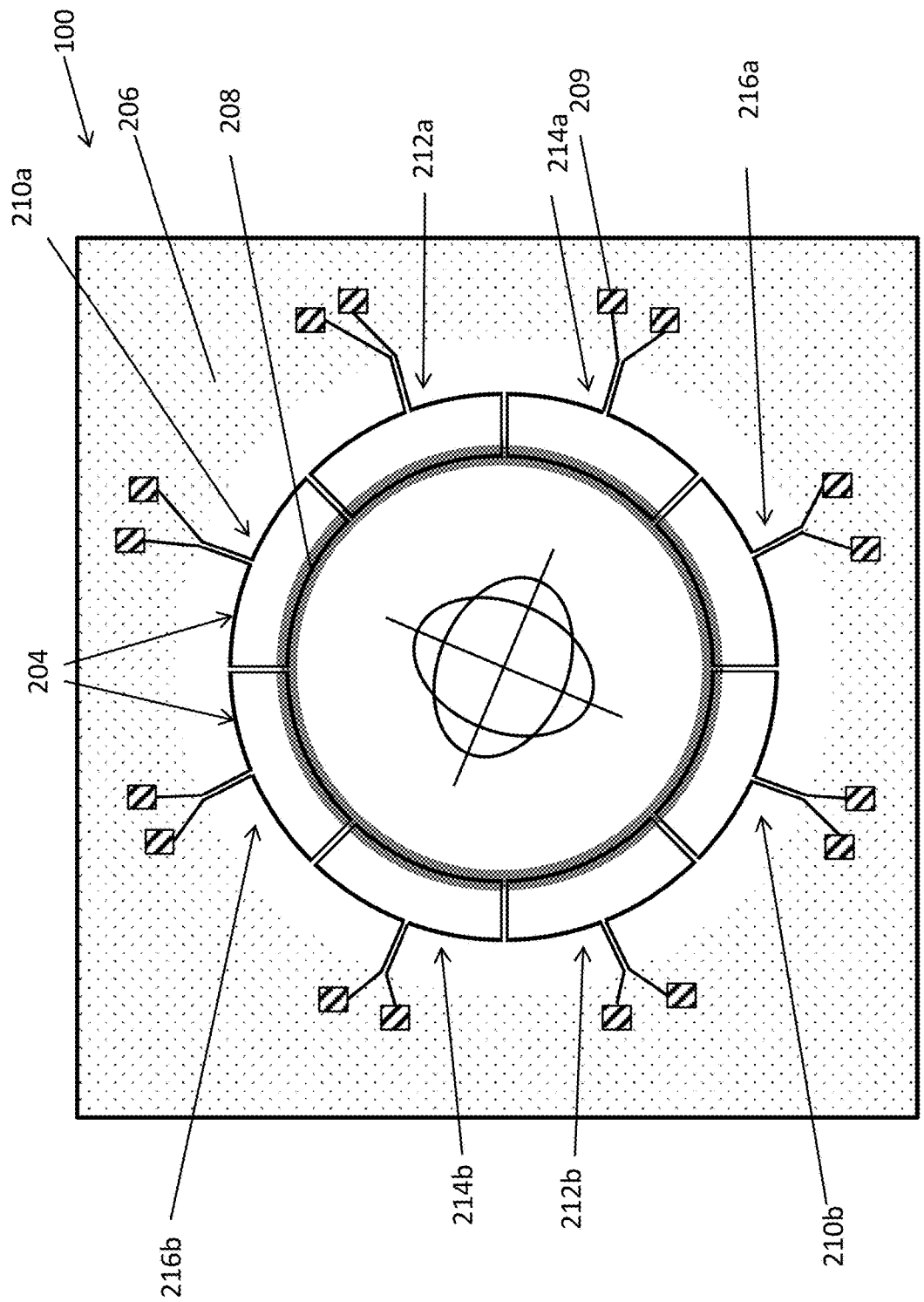
FIG. 2 shows a plan view of a vibrating structure angular rate sensor typical of the prior art.

FIG. 2 shows a cross sectional top-down view of the inductive type vibrating structure angular rate sensor 100. The planar annular member 202 is flexibly supported by eight supporting structures 204, each comprising a pair of mirror image legs, which are arranged equiangularly around the annular member 202 and are connected to a substrate 206. The annular member 202 comprises eight transducer segments 208 comprising metal tracking disposed on the surface of the annular member 202. The transducer segments 208 are positioned such that their centres align with nodes of the primary and secondary cos 2θ mode oscillations, as indicated by the schematic diagram drawn in the centre of the sensor 100. A plurality of bond pads 209 are positioned on the substrate 206 and each transducer segment 208 is connected to a pair of bond pads 209 via metal tracking disposed on the surface of each supporting structure 204 to form eight transducer circuits.

Each of the transducer circuits runs from a first bond pad 209, along a leg of a first supporting structure 204 to the end of a transducer segment 208. Each circuit then continues along the transducer segment 208 and returns along a leg of a second supporting structure 204 to a second bond pad 209. As will be explained below, these circuits are used to both drive the annular member 202 into oscillation and to sense oscillations of the annular member 202. Note that in FIG. 2 the legs of each supporting structure 204 are shown as simple lines, with no distinction made between the metal tracking and the underlying silicon die. In reality however, metal tracking is disposed on the surface of each supporting structure 204, as with the transducer segments 208 and tracking on the substrate 206. This can be seen more clearly in FIG. 5.

Of the eight transducer circuits formed, two are primary driver circuits 210a, 210b, aligned with nodes of the primary cos 2θ mode (depicted diagrammatically in the centre of FIG. 2 and in FIG. 3a); two are secondary driver circuits 212a, 212b, aligned with nodes of the secondary cos 2θ mode (depicted diagrammatically in FIG. 3b); two are primary pick-off circuits 214a, 214b, aligned with nodes of the primary cos 2θ mode and two are secondary pick-off circuits 216a, 216b, aligned with nodes of the secondary cos 2θ mode.

During manufacture, the sensor 100 undergoes a process called laser balancing. A balancing system (not shown) applies an oscillating current to the primary driver circuits 210a, 210b to drive the annular member to oscillate in the primary cos nθ mode. The primary pick-off circuits 214a, b are used to sense this oscillation and determine the actual resonant frequency of the primary cos 2θ mode.

The balancing system separately applies an oscillating current to the secondary driver circuits 212a, b, and detects motion using the secondary pick-off circuits 216a, b to determine the resonant frequency of the secondary cos 2θ mode.

In order to balance the two modes (i.e. make their resonant frequencies equal) the balancing system also comprises a laser, which selectively removes material from the annular member 202, to adjust the resonant frequency of each mode. Once the balancing procedure is complete, the frequency difference (or "splitting") between the two modes is typically less than 1 Hz for a 14 kHz oscillator.

In a typical prior art use, the angular rate sensor 100 is driven using a drive system (not shown). The bond pads 209 are connected to the drive system, from which oscillating current is supplied to the primary driver circuits 210a, 201b as described above. This causes different sections of the annular member 202 to experience periodic radial Lorenz forces, causing the angular member to oscillate in the in-plane primary cos 2θ mode.

Figure 3B:
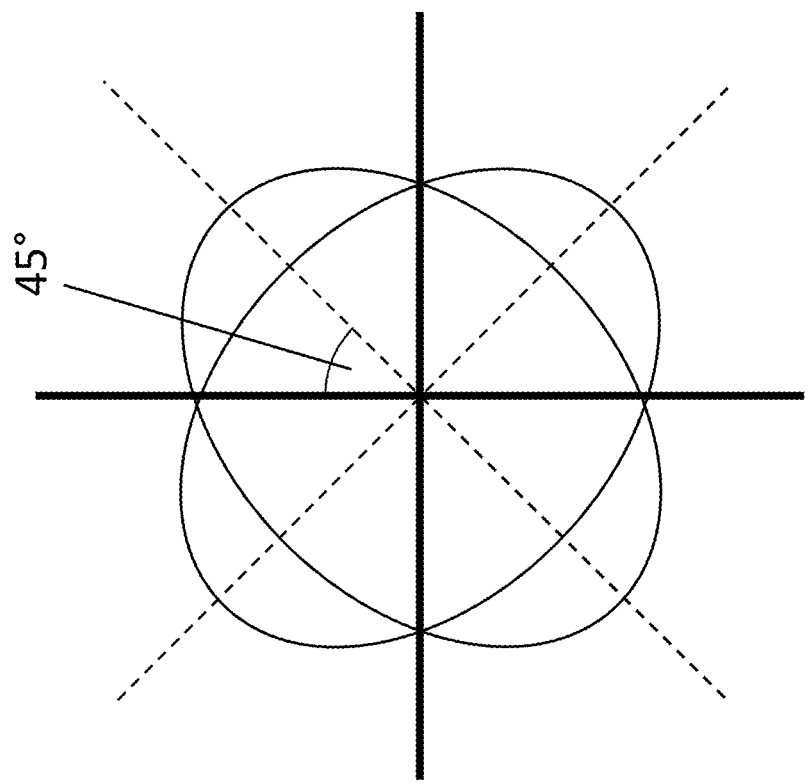
FIGS. 3a and 3b show, diagrammatically, primary (3a) Cos 2θ and secondary (3b) Sin 2θ vibration modes in an annular resonator
Figure 3A:
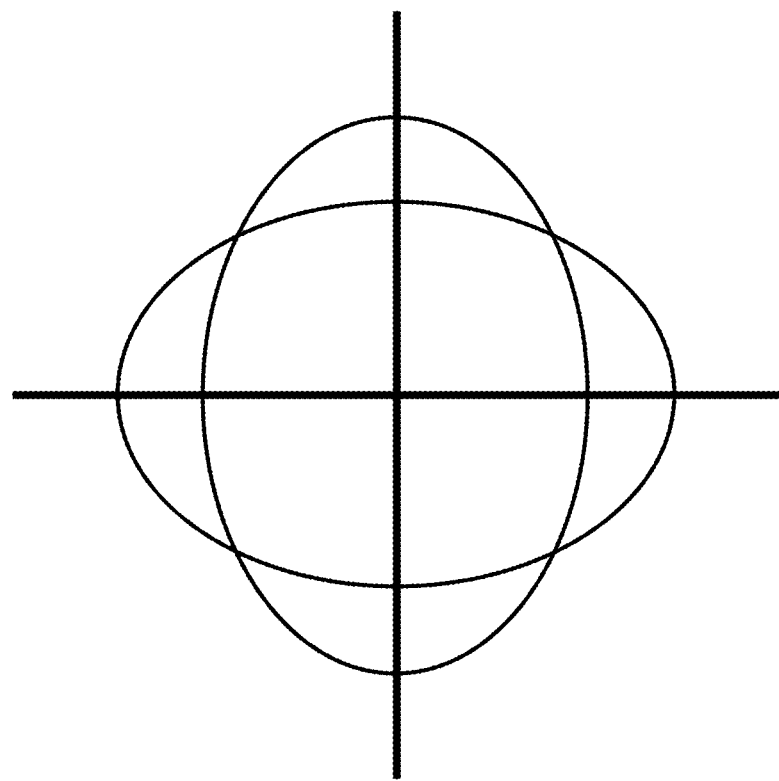

When the sensor 100 experiences a rotation during primary mode oscillation about an axis perpendicular to the plane in which the annular member 202 lies, the Coriolis effect induces oscillation in the secondary sin 2θ mode, which is 45° offset from the primary mode of oscillation (depicted diagrammatically in FIG. 3b). The amplitude of the secondary mode oscillations is dependent upon both the amplitude of the primary mode oscillations and the rate of rotation.

As described above, each of the supporting structures 204 carries an electrical connection from a transducer segment 208 to the drive system, or in other words comprises an "active" supporting structure.

Figure 7:
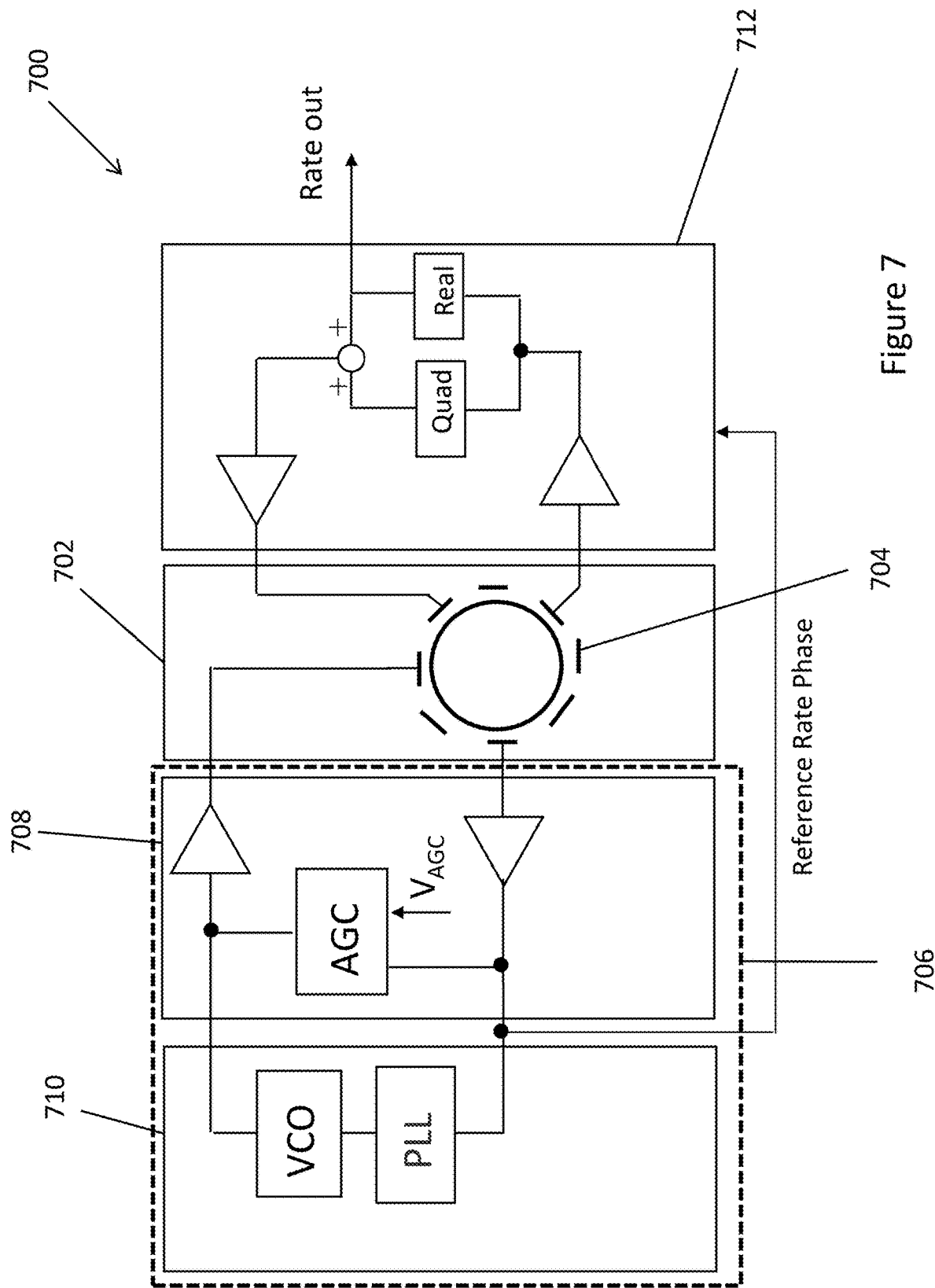
FIG. 7 shows an example of a complete angular rate sensor system.

In open loop operation, the amplitude of the induced secondary mode oscillation is sensed by a pick-off system (not shown) connected to the secondary pick-off circuits 216a, b, and the angular rate experienced by the sensor 100 is calculated from the sensed secondary amplitude. In closed loop operation, the pick-off system applies a nulling force using the secondary driver circuits 212a, b to null the oscillation in the secondary mode. The magnitude of the force required to null secondary oscillation is used to calculate the angular rate. FIG. 7 illustrates an example of a complete angular sensor system, including drive and pick-off systems.

At high amplitudes of oscillation, e.g. in the primary mode, the annular member 202 experiences non-linear restoring forces from the supporting structures 204, causing a shift in the resonant frequency of the annular member 202. As the amplitudes of oscillation of the primary (driven) and secondary (induced) modes of oscillation are different, a different shift in resonant frequency is seen in the primary and secondary modes. This frequency splitting leads to increased noise and decreased sensitivity, even when the oscillator is laser balanced prior to use.

Figure 4:
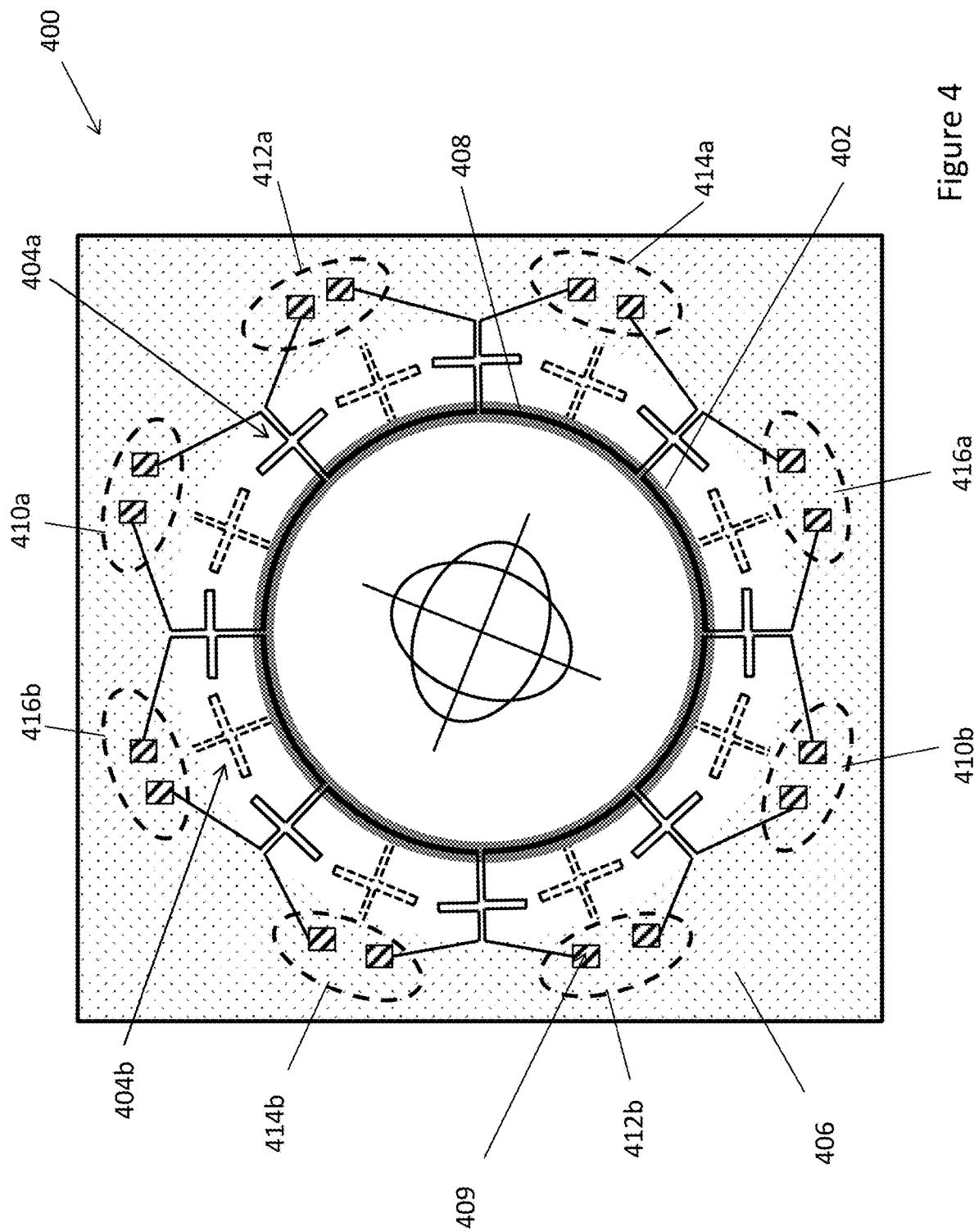
FIG. 4 illustrates a plan view of a vibrating structure angular rate sensor according to the present disclosure.

FIG. 4 shows a vibrating structure angular rate sensor 400, according to an example of the present disclosure, in which this frequency splitting due to non-linearity is mitigated by providing both active and passive supporting structures.

The angular rate sensor 400 comprises a planar annular member 402, in the form of a ring in this example. The annular member 402 is flexibly supported by eight active supporting structures 404a and eight passive supporting structures 404b. Each of the active and passive supporting structures 404a, 404b, comprises a pair of respective active or passive sub-structures in the form of mirror image legs. The active and passive supporting structures 404a, 404b are equiangularly spaced and alternate type (i.e. active or passive) around the annular member 402. The active and passive supporting structures 404a, 404b are physically connected to an outer support frame 406 at one end and to a contact point on the annular member 402 at the other end, with both of the mirror image legs making up each supporting structure 404a, 404b contacting the annular member 402 at substantially the same angular position e.g. around the circumference of the annular member 402. The annular member 402 being flexibly supported means that the active and passive supporting structures 404a, 404b can flex to allow the annular member 402 to oscillate e.g. moving elastically in-plane relative to the substrate 406.

The annular member 402 comprises eight transducer segments 408 comprising metal tracking disposed on the surface of the annular member 402. The transducer segments 408 are positioned such that their centres align with nodes of the primary and secondary cos 2θ mode oscillations, as indicated by the schematic diagram drawn in the centre of the sensor 400. A plurality of bond pads 409 are positioned on the support frame 406 and each transducer segment 408 is electrically connected to a pair of the plurality of bond pads 409 via metal tracking disposed on the surface of each of the active mirror image legs making up the active supporting structures 404a. This forms eight active electrical connections. Each transducer segment 408 extends from one active supporting structure 404a to the next, spanning the passive supporting structure 404b positioned therebetween. The passive supporting structures 404b may also carry metal tracking, for manufacturing ease, but are not electrically connected to any of the transducer segments 408 or the bond pads 409.

Similarly to the angular rate sensor 100 shown in FIG. 2 and described above, there is an electrical connection from a first bond pad 409, along a leg of a first active supporting structure to a first end of a transducer segment 408, then running along the transducer segment 408 to a second end, and returning along a leg of a second active supporting structure to a second bond pad. The first and second bond pads are arranged in pairs, one pair for each transducer segment 408. Each pair of bond pads provides an active electrical connection to the drive system. As with the prior art sensor 100, these electrical connections may be used to both drive the annular member 402 into oscillation and also to sense oscillation of the annular member 402.

Of the eight active electrical connections formed, two are primary driver circuits 410a, 410b, aligned with nodes of the primary cos 2θ mode (depicted diagrammatically in the centre of FIG. 4 and in FIG. 3a); two are secondary driver circuits 412a, 412b, aligned with nodes of the secondary cos 2θ mode (depicted diagrammatically in FIG. 3b); two are primary pick-off circuits 414a, 414b, aligned with nodes of the primary cos 2θ mode and two are secondary pick-off circuits 416a, 416b, aligned with nodes of the secondary cos 2θ mode.

It is highlighted that the angular positions of the transducer segments 408 are identical to those seen in the prior art angular rate sensor 100 shown in FIG. 2. Accordingly, the operation of the angular rate sensor 400 is similar to that of the prior art angular rate sensor 100. The sensor 400 may be laser balanced prior to use, as described above, to match the resonant frequencies of the primary and secondary cos 2θ modes.

In use, oscillating current/voltage is provided by an electrical drive system (not shown) to the transducer segments 408 via the primary driver circuits 410a, 410b and the associated active supporting structures 404a. This causes the annular member 402 to oscillate in the primary cos 2θ mode.

When the sensor 400 experiences a rotation, while oscillating in the primary cos 2θ mode, about an axis perpendicular to the plane in which the annular member 402 lies, the Coriolis effect induces oscillation in the secondary sin 2θ mode, which is 45° offset from the primary cos 2θ mode of oscillation (depicted diagrammatically in FIG. 3b). In open loop operation, a pick-off system (not shown) uses the secondary pick-off circuits 416a, 416b to directly sense the amplitude of this induced oscillation and calculate the angular rate of rotation. In closed loop operation, a pick-off system (not shown) uses the secondary driver circuits 412a, 412b to indirectly sense the amplitude of this induced oscillation, and calculate the angular rate of rotation, depending on the current/voltage that is applied to null the motion. FIG. 7 illustrates an example of a complete angular rate sensor system, including the electrical drive and pick-off systems.

As mentioned above, the operation of the sensor 400 is very similar to that of the prior art sensor 100. However, due to the provision of 16 (active and passive) supporting structures 404a, 404b, frequency splitting between the primary and secondary modes is mitigated, increasing the sensitivity of the sensor.

The annular member 402 has the same shape and dimensions to that of the prior art annular member 102, to enable compatibility with existing manufacturing and testing facilities. However, in order to provide the required number of supporting structures 404a, 404b to mitigate frequency splitting (which in this case is 16), each of the supporting structures 404a, 404b comprises a particular shape with a reduced angular footprint.

A preferred shape of the supporting structures is shown in more detail in FIG. 6, which shows a close up view of two supporting structures, namely an active supporting structure 404a and an adjacent passive supporting structure 404b, each supporting structure 404a, 404b comprising a pair of mirror image legs. Each of the mirror image legs comprises a first radial portion 602 connected to a second radial portion 604 by a "U" shaped circumferential portion 606. The first and second radial portions 602, 604 are angularly aligned, with the result being that the angular extent A of each of the supporting structures 404a, 404b is roughly half that of the prior art supporting structures 204 shown in FIG. 5.

It can be seen that this particular shape enables two supporting structures 404a, 404b (two pairs of mirror image legs) to take up the same physical area as only one of the prior art supporting structures 204 (one pair of mirror image legs), while still providing the support and flexibility required for effective operation. Note that, to allow for a direct comparison of the angular extent of the supporting structures, FIG. 6 has been angularly offset by a small amount compared to FIG. 5. In reality the transducer segments are in the same position in both the prior art and the presently disclosed sensor, indicated in FIGS. 5 and 6 by the angular position line marked B.

FIG. 7 is a block diagram showing a complete angular rate sensor system 700. The sensor system 700 comprises an annular resonator 702, comprising eight transducers 704 made up of two primary drive transducers, two primary pick-off transducers, two secondary driver transducers and two secondary pick-off transducers. The primary drive transducers are connected to a primary control loop 706, which comprises an amplitude control loop 708 and a frequency control loop 710.

In use, the primary control loop 706 acts as an electrical drive system, which provides oscillating current/voltage to the primary drive transducers in order to drive the resonator into resonance in a primary cos 2θ mode of oscillation, as described above. The primary control loop 706 is also connected to the primary pick-off transducers to provide feedback to the primary control loop and ensure that the oscillating current/voltage is delivered at the resonant frequency of the resonator.

The secondary drive and pick-off transducers are connected to a secondary control loop 712, which acts as a closed-loop pick-off system operable to determine the amplitude of secondary cos 2θ mode oscillations caused by the sensor system 700 experiencing a rotation at an angular rate. This is achieved by applying an oscillating current/voltage to the secondary drive transducers to null the induced secondary mode oscillation. The secondary pick-off transducers provide feedback to the secondary control loop 712, to ensure that only the precise amount of nulling force required is applied. The amount of oscillating current/voltage that must be applied to completely null the induced secondary oscillation may then be used to determine the amplitude of the induced secondary mode oscillation and thus the angular rate experienced by the annular resonator 702.

The invention claimed is:

1. A vibrating structure angular rate sensor comprising:
   a substrate;
   a plurality of flexible supporting structures fixed to the substrate;
   an annular member which is flexibly supported by the plurality of supporting structures to move elastically relative to the substrate; and
   an electrical drive system configured to drive the annular member to oscillate in a primary mode of oscillation with a resonant frequency $f_1$;
   wherein the plurality of supporting structures comprises:
   at least one active supporting structure which carries an active electrical connection from the annular member to the drive system; and at least one passive supporting structure which does not carry an active electrical connection from the annular member to the drive system;

wherein one or more of the supporting structures comprises a first radial portion connected to a second radial portion that is angularly aligned with the first radial portion, the first and second radial portions being connected by a U-shaped circumferential portion.

2. The vibrating angular rate sensor as claimed in claim 1, further comprising: a pick-off system arranged to determine the amplitude of motion of a secondary mode of oscillation at a resonant frequency $f_2$.

3. The vibrating angular rate sensor as claimed in claim 2, wherein a total number p of the active and passive supporting structures is selected such that $f_1=f_2$.

4. The vibrating angular rate sensor as claim 1 wherein the primary mode of oscillation is a cos nθ mode, and the secondary mode of oscillation is a sin nθ mode, where n is the order of the mode, and is equal to any positive integer.

5. The vibrating angular rate sensor as claimed in claim 4, wherein a total number of active and passive supporting structures p is chosen such that $$k\frac{n}{p} \neq \text{integer,}$$

where k is an integer between 1 and 6 and n is the order of the primary mode of oscillation.

6. The vibrating angular rate sensor as claimed in claim 1, the annular member comprising a plurality of transducers arranged around its circumference.

7. The vibrating angular rate sensor as claimed in claim 6, wherein the at least one active supporting structure comprises a plurality of active supporting structures arranged to form active electrical connections from the drive system to each of the plurality of transducers.

8. The vibrating angular rate sensor as claimed in claim 7, wherein the active electrical connections between the drive system and each of the plurality of transducers comprise conductive tracking disposed on the active supporting structures.

9. The vibrating angular rate sensor as claimed in claim 1, wherein the shape and/or dimensions of the at least one passive supporting structure is identical to those of the at least one active supporting structure.

10. The vibrating angular rate sensor as claimed in claim 1, wherein the active and passive supporting structures are spaced equiangularly around a circumference of the annular member.

11. The vibrating angular rate sensor as claimed in claim 1, wherein each active and/or passive supporting structure comprises a pair of respective active or passive sub-structures, the sub-structures being physically separate but both contacting the annular member at a point having substantially the same angular position around a circumference of the annular member.

12. The vibrating angular rate sensor as claimed in claim 1, wherein the active and passive supporting structures are arranged such that each active supporting structure alternates with a passive supporting structure around a circumference of the annular member.

13. The vibrating angular rate sensor as claimed in claim 1, wherein a total number of active and passive supporting structures is chosen to be the lowest value of p that satisfies $$k\frac{n}{p} \neq \text{integer}$$

and allows an integer number of active and passive supporting structures to be positioned equiangularly within an angular offset φ of the primary and secondary modes of oscillation.

14. A method of making a vibrating structure angular rate sensor, the angular rate sensor comprising a substrate, a plurality of flexible supporting structures fixed to the substrate and an annular member flexibly supported by the plurality of supporting structures to move elastically relative to the substrate;

the method comprising selecting a total number of the plurality of supporting structures to include:

at least one active supporting structure which carries an active electrical connection from the annular member to the drive system; and at least one passive supporting structure which does not carry an active electrical connection from the annular member to the drive system;

wherein one or more of the supporting structures comprises a first radial portion connected to a second radial portion that is angularly aligned with the first radial portion, the first and second radial portions being connected by a U-shaped circumferential portion.

* * * * *